(12) United States Patent
McGrath

(10) Patent No.: US 9,260,025 B1
(45) Date of Patent: Feb. 16, 2016

(54) HARNESSING HEAT DURING ELECTRIC VEHICLE CHARGING

(71) Applicant: Proterra Inc., Greenville, SC (US)

(72) Inventor: Seamus Timothy McGrath, Simpsonville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/661,060

(22) Filed: Mar. 18, 2015

(51) Int. Cl.
| *H02J 7/00* | (2006.01) |
| *B60L 11/00* | (2006.01) |
| *B60L 11/18* | (2006.01) |
| *F24H 3/02* | (2006.01) |
| *F24H 9/00* | (2006.01) |

(52) U.S. Cl.
CPC ............ *B60L 11/1816* (2013.01); *F24H 3/022* (2013.01); *F24H 9/0063* (2013.01)

(58) Field of Classification Search
CPC .............. B60L 11/182; B60L 11/1838; B60L 11/1818; B60L 11/1846; B60L 11/1862
USPC ............................................. 320/109; 701/22
See application file for complete search history.

(56) References Cited

U.S. PATENT DOCUMENTS

| 4,364,444 | A | * | 12/1982 | Donato et al. | ............... | 180/65.1 |
| 5,323,099 | A | * | 6/1994 | Bruni et al. | .................... | 320/108 |
| 5,624,003 | A | * | 4/1997 | Matsuki et al. | .............. | 180/65.1 |
| 5,847,537 | A | * | 12/1998 | Parmley, Sr. | .................. | 320/109 |
| 6,629,417 | B2 | * | 10/2003 | Haas et al. | ........................ | 62/3.2 |
| 7,758,203 | B2 | * | 7/2010 | McMahon et al. | ............ | 362/183 |
| 8,058,841 | B2 | * | 11/2011 | Chander et al. | ............... | 320/115 |
| 8,127,564 | B2 | * | 3/2012 | Takamatsu et al. | ............. | 62/239 |
| 8,142,352 | B2 | * | 3/2012 | Vivenzio et al. | .............. | 600/199 |
| 8,386,103 | B2 | * | 2/2013 | Tran | ................................ | 701/22 |
| 2007/0230167 | A1 | * | 10/2007 | McMahon et al. | ............ | 362/157 |
| 2011/0072841 | A1 | * | 3/2011 | Arai et al. | ..................... | 62/259.2 |
| 2011/0074351 | A1 | * | 3/2011 | Bianco et al. | ................. | 320/109 |
| 2013/0069588 | A1 | * | 3/2013 | Oda et al. | ....................... | 320/109 |
| 2013/0193918 | A1 | | 8/2013 | Sarkar et al. | | |
| 2014/0070767 | A1 | | 3/2014 | Morris et al. | | |

* cited by examiner

*Primary Examiner* — M'Baye Diao
(74) *Attorney, Agent, or Firm* — Bookoff McAndrews, PLLC

(57) ABSTRACT

A method of operating an electric vehicle charging station. The charging station may include a console housing components configured to receive current from an electric grid and convert the current to a form adapted to be received by the electric vehicle. The method may include transferring heat from the components in the console to air flowing through the console to form heated air, and directing the heated air from the console into a duct fluidly coupled to the console. The method may further include exhausting the heated air from the duct to a location remote from the console.

20 Claims, 5 Drawing Sheets

HARNESSING HEAT DURING ELECTRIC VEHICLE CHARGING

TECHNICAL FIELD

The current disclosure relates to systems and methods for harnessing heat produced during electric vehicle charging.

BACKGROUND

An electric vehicle (EV), also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external charger. As current flows, components in the external charger and the battery may get heated due to joule heating. The vehicle cooling system may cool the components of battery, and an air handling system may force air past the heated components of the external charger to cool them. Typically, the heated air is exhausted into the atmosphere thereby wasting the heat extracted from the components. An increase in efficiency and cost savings may be achieved by harnessing the waste heat produced during charging to do useful work.

SUMMARY

Embodiments of the present disclosure relate to, among other things, systems and methods for harnessing heat produced during electric vehicle charging. Each of the embodiments disclosed herein may include one or more of the features described in connection with any of the other disclosed embodiments.

In one embodiment, a method of operating an electric vehicle charging station is disclosed. The charging station may include a console housing components configured to receive current from an electric grid and convert the current to a form adapted to be received by the electric vehicle. The method may include transferring heat from the components in the console to air flowing through the console to form heated air, and directing the heated air from the console into a duct fluidly coupled to the console. The method may further include exhausting the heated air from the duct to a location remote from the console.

In another embodiment, a method of operating a charging station of an electric bus is disclosed. The charging station may include a console housing one or more components configured to convert AC current from an electric grid to DC current for the electric vehicle, and a charge head assembly configured to electrically couple with the electric bus. The method may include transferring heat from the one or more components in the console to a coolant flowing through the console. The method may also include directing the coolant to a location remote from the console to dissipate the heat the location.

In yet another embodiment, a charging station for an electric vehicle is disclosed. The charging station may include a charging head assembly configured to interface and form an electrical connection with an electric vehicle. The station may also include a console electrically coupled to the charging head assembly. The console may house components configured to receive current from an electric grid and convert the current to a form that may be received by the electric vehicle. The console may further be configured to direct a flow of air therethrough to absorb heat from the components and form heated air. The station may also include a duct connected to the console to receive the heated air from the console and discharge the heated air to a location remote from the console.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for harnessing heat produced during the charging of an electric vehicle to do useful work and thereby increase efficiency and reduce costs. While principles of the current disclosure are described with reference to an electric bus, it should be understood that the disclosure is not limited thereto. Rather, the systems and methods of the present disclosure may be used in the charging of any vehicle (trains, cars, etc.) that uses one or more electric motors (alone or in combination with another power source) for propulsion.

Figure 1:
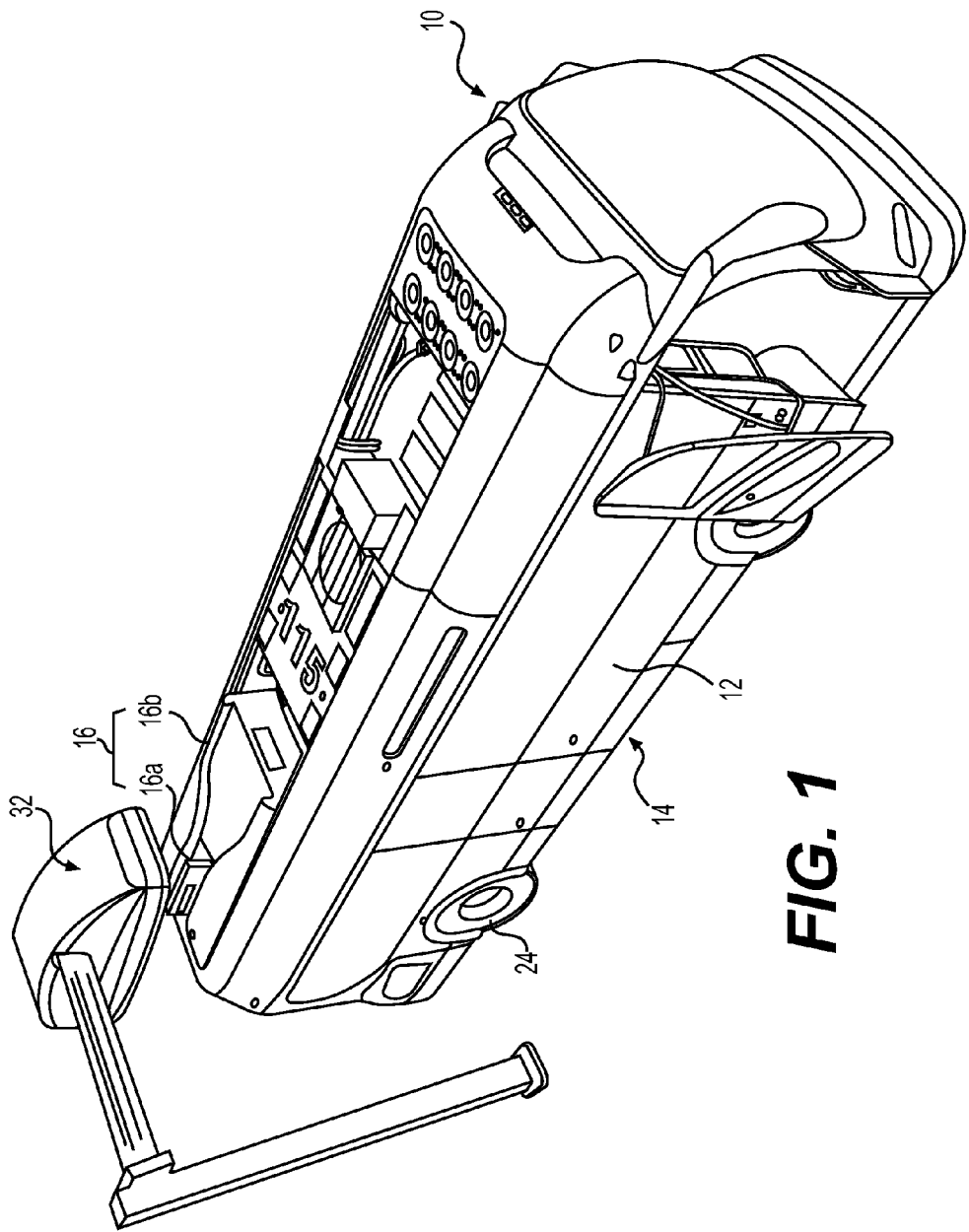
FIG. 1 is an illustration of an exemplary electric bus according to the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of bus 10. Without limitation, body 12 of bus 10 may have any size, shape, and configuration. In some embodiments, bus 10 may be a low-floor electric bus. As is known in the art, in a low-floor bus, there are no steps at the front and/or the back doors of the bus. In such a bus, the floor is positioned close to the road surface to ease entry and exit into the bus 10. In some embodiments, the floor height of the low-floor bus may be about 12-16 inches from the road surface. In this disclosure, the term "about" is used to indicate a possible variation of ±10% in a stated numeric value.

Bus 10 may include a powertrain (not shown) that propels the bus 10 along a road surface. The powertrain may include an electric motor that generates power, and a transmission that transmits the power to drive wheels 24 of the bus 10. Batteries 14 may store electrical energy to power the electric motor. In some embodiments, these batteries 14 may be positioned under the floor of the bus 10, and may be configured as a plurality of battery packs. These battery packs may be positioned in cavities (not shown) located under the floor of the bus 10, and may be accessible from below the bus 10. The batteries 14 may have any chemistry and construction. In some embodiments, the batteries 14 may be lithium titanate batteries. In some embodiments, the layout and design of the batteries 14 may enable fast charging of the batteries 14. By fast charging, batteries 14 may be recharged (to greater than about 95% state of charge) in less than or equal to about 10 minutes.

A charging interface 16 may be provided on the roof of the bus 10 (or elsewhere) to charge the batteries 14. The charging interface 16 may include components that interface with a charge head assembly 32 of an external charging station to charge the batteries 14. These components may include a charging blade 16a and an alignment scoop 16b. The alignment scoop 16b may align and direct the overhanging charge head assembly 32 towards the charging blade 16a to electrically connect them and charge the batteries 14.

Electric bus 10 may be a transit bus that operates along a fixed route in a geographic area (city, town, airport, campus, etc.). Bus 10 may continuously travel on the route picking up and dropping off passengers at several bus stops along the route. One or more charging stations may be located on the route to charge the buses 10. Some of these charging stations may be located at bus stops. A bus 10 may be recharged while passengers embark and disembark at the bus stop.

Figure 2A:
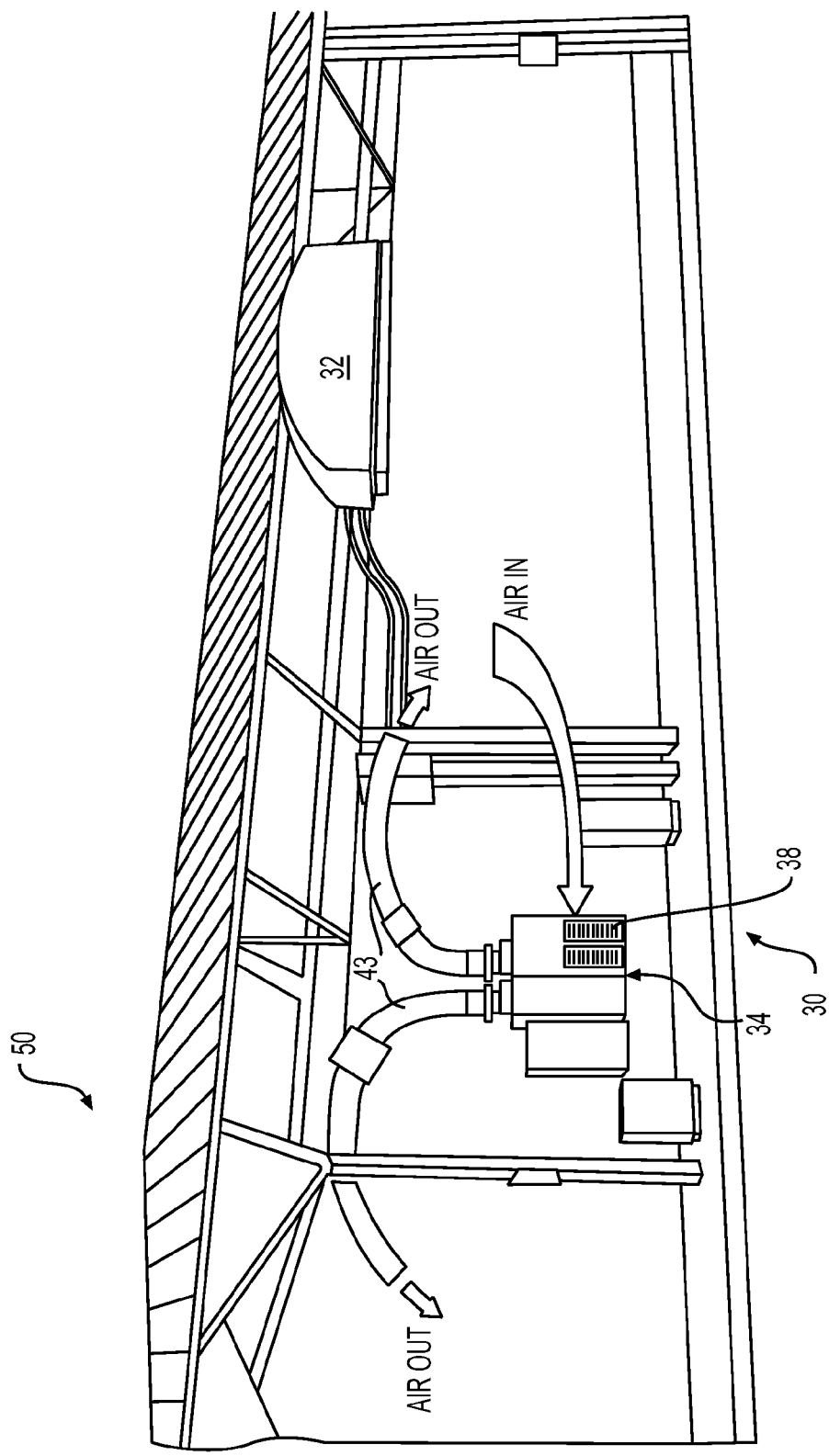
FIG. 2A is a bus stop with an exemplary charging station.

FIG. 2A illustrates a bus stop 50 having a charging station 30. A charge console 34 of the charging station 30 may be coupled to an electric grid that is supplied with energy (electricity) by a utility company. Single phase or three-phase AC current from the electrical grid may be directed into the charge console 34. The charge console 34 may be electrically coupled, and adapted to provide power, to the charge head assembly 32. The charge console 34 may house electrical components (e.g., rectifier, power converter, switches, safety mechanisms, etc.) that are configured to convert power from the grid to a form that may be supplied to the bus 10 through the charge head assembly 32. A bus 10 may pull up to the bus stop 50 and position itself proximate the charge head assembly 32. Electrodes in the charge head assembly may then separably interface with the charging interface 16 of the bus 10 to electrically connect the bus 10 to the charging station 30. Details of the charge head assembly 32 and the interfacing of the charge head assembly 32 with the charging interface 16 are described in commonly assigned patent applications US 2013/0193918 A1 and US 2014/0070767 A1, which are incorporated by reference in their entirety herein.

Figure 2B:
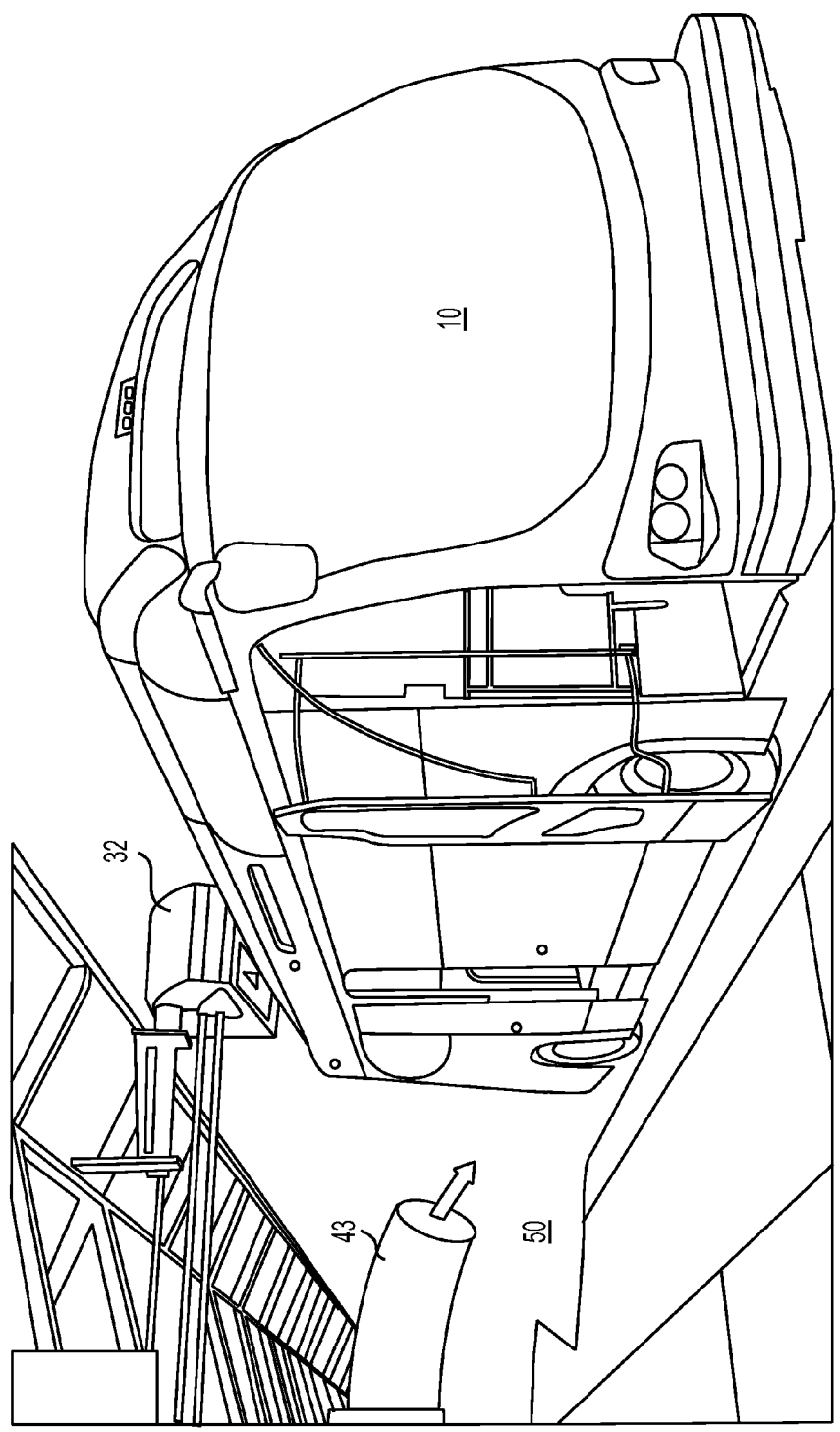
FIG. 2B illustrates a bus charging at the charging station of FIG. 2A.

FIG. 2B illustrates a bus 10 with its charging interface 16 electrically connected with the charge head assembly 32. In the discussion that follows, reference will be made to both FIGS. 2A and 2B. The charging interface 16 and the charge head assembly 32 may include mating electrodes that indicate (e.g., by a pilot signal) a proper electrical connection between the bus 10 and the charging station 30. Upon receipt of this pilot signal, charging of the bus 10 may be initiated. During charging, single phase or three-phase AC current from the electric grid may be converted to DC current having variable power in the charge console 34 and input to the bus 10 through the charge head assembly 32. This DC power may be used to charge the batteries 14. The conversion of AC to DC current and the flow of current through electrical contacts of the charging station 30 and the bus 10 produces heat.

Figure 3:
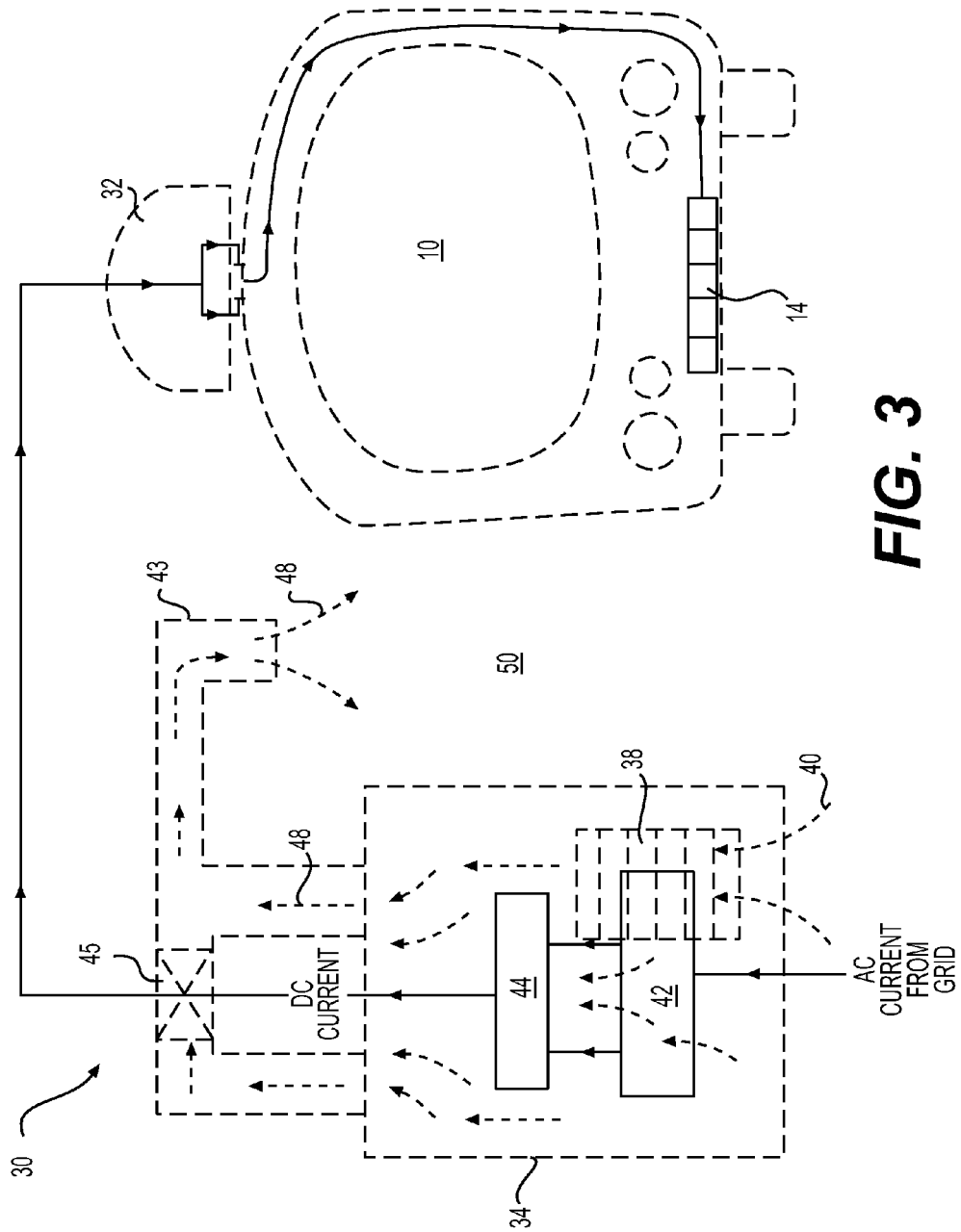
FIG. 3 is a schematic illustration of the charging station of FIG. 2A.

FIG. 3 is a schematic illustration of the charging of bus 10 at charging station 30. At the charge console 34, the AC current from the grid is converted to DC current at a rectifier 42. The DC current is then controlled with a secondary power converter 44 to achieve the desired power. The charge console 34 may be configured to charge the bus 10 at any value of power (500 KW, 300 KW, etc.). As known in the art, the rectifier 42 and the power converter 44 include electrical devices such as insulated-gate bipolar transistors (IGBTs) and diodes that function to convert the AC current to DC current at the desired power. The conversion of AC current to DC current and the flow of this current to the batteries 14 produce heat. At 95% conversion efficiency, about 25 kW of heat is generated while performing a 500 KW charge. A majority of this heat is generated in the charge console 34. A coolant may be circulated through the charge console 34 to collect the heat produced therein, and discharge the collected heat at selected areas of the bus stop 50, located remote from the charge console 34, for heating.

In general, any type of coolant may be used to collect heat from the charge console 34. In the embodiment illustrated in FIG. 3, cool air 40, directed into the charge console 34 through a vent 38, is used to collect the heat from the heat producing components therein. The heated air 48 from the charge console 34 may be directed through a duct 43 and discharged at an area of the bus stop 50 that is desired to be heated. Duct 43 may be a conduit (pipe, air passage, etc.) that is fluidly coupled to an opening of the charge console 34 and extending to the area which is desired to be heated. The duct 43 may include one or more air moving components (e.g., fans, blowers 45, etc.) that are configured to force the heated air through the duct 43. Although not illustrated, duct 43 may also include air handling (filter racks or chambers, sound attenuators, dampers, etc.) and flow modifying components (louvers, etc.) to condition the air before it is discharged at the desired location.

The heated air 48 may be used to heat any desired area of the bus stop 50 that is remote from the charge console 34. In prior art charging stations, air used to cool the console is exhausted to the atmosphere through a vent formed on the console (typically, on the top of the console). In contrast, in the current disclosure, the air used to cool the charge console 34 is exhausted to a location remote from the charge console 34 to heat this location. In this disclosure, the phrase "remote from" the charge console 34 is intended to exclude applications in which the heated air is exhausted immediately adjacent to the charge console 34 (as in prior art charging stations). That is, in this disclosure, a location remote from the charge console 34 refers to a location that is not immediately adjacent to the charge console 34. While the distance of a remote location from the charge console 34 may vary with application, in some embodiments, this remote location may be >5 feet from the charge console 34.

The heated air 48 may be used to heat any desired area of the bus stop 50 that is remote from the charge console 34. In some embodiments, the heated air 48 may be used to heat a passenger waiting area (e.g., waiting room, area in front of the bus doors, etc.) of bus stop 50. In some embodiments, snow/ice in the passenger area may be melted using the heated air 48 from console 34. In such embodiments, the duct 43 from the charge console 34 may terminate at the passenger waiting area to direct the heated air 48 to this area. In some embodiments, the heated air 48 may be used to heat the charging interface 16 of the charging bus 10. Accumulated snow and ice on the roof of the bus 10 may make the electrical connection between the charging interface 16 and the charge head assembly 32 weak. Heated air 48 blown over the charging interface 16 may assist in melting the accumulated snow/ice and make a good electrical connection between the charging interface 16 and the charge head assembly 32. In such embodiments, the duct 43 may extend from the charge console 34 to a region proximate the charge head assembly 32.

In some embodiments, the duct 43 may direct the heated air 48 to the charge head assembly 32, and the heated air 48 may flow over the charging interface 16 through the charge head assembly 32. In such embodiments, the heated air 48 may heat the mating electrodes of the charge head assembly 32 and the charging interface 16. In some such embodiments, the electrical conduit that directs power from the charging console 34 to the charge head assembly 32 may also extend through, or alongside, duct 43. In some embodiments, the heated air 48 may be directed to other areas of the bus stop 50, such as, for example, over the top of a charging bus, over a seating area of the bus stop (even to heat seats), at the front and/or rear door of the charging bus, at the curb near the charging bus, etc. It is also contemplated that the heated air 48 may be fluidly coupled to a nearby building heating system to heat the bus stop 50 or another portions of another building.

In some embodiments, duct 43 may extend from the charge console 34 to different areas of the bus stop 50. For example, the duct 43 may include branches to direct the heated air 48 from the charge console 34 to some or all of the regions described above. In some embodiments, flow control devices (e.g., air vanes, guides, etc.) may selectively direct the heated air 48 through a desired branch of the duct 43. Thermostats and/or switches may be used to select the branch of the duct 43 through which the heated air 48 flows. For example, thermostats positioned in different areas (charge head assembly 32, curb, etc.) of the bus stop 50 may automatically operate air guides in the duct 43 and selectively direct the heated air 48 to a desired area. It is also contemplated that, in some embodiments, the air guides may be operated manually to selectively direct the heated air 48 to the desired area.

In some embodiments, a control system may control the flow of air through the ducts 42. For example, based on predetermined selection criteria (number of passengers waiting in an area, ambient temperature of an area, etc.), the control system may select the areas to which heated air 48 is directed. Based on this selection, the control system may operate the air guides to direct the heated air 48 to the selected area. In some embodiments, the control system may control the flow rate of air through the charge console 34 to adjust the temperature of the heated air 48. For example, the control system may reduce the flow rate of air flowing through the charge console 34 to increase a temperature of the heated air 48 and decrease the flow rate of air flowing through the charge console 34 to reduce the temperature of the heated air 48. In some embodiments, the control system may mix the heated air 48 with other air to adjust its temperature. For example, a mixing chamber may be provided in duct 43, and the control system may mix ambient air with the heated air 48 to reduce its temperature. In some embodiments, duct 43 may include heating elements (filament heaters, etc.) that may be activated to increase the temperature of the heated air 48.

The duct 43 may extend above ground (as illustrated in FIG. 3) and/or underground. In some embodiments, branches of the duct 43 that direct the heated air 48 to some areas (e.g., charge head assembly 32, passenger waiting area, etc.) may extend above ground, while branches of the duct 43 that directs the heated air 48 to other areas (e.g., to the curb adjacent to the charging bus) may extend underground. In some embodiments, the heated air 48 may transfer heat to a liquid heat exchanger (not shown) to provide a warm water heating loop for selected areas. For example, in some embodiments, a duct 43 may exhaust heated air 48 to some areas of the bus stop for heating the area (e.g., passenger waiting area, etc.), and a warm water loop (e.g., embedded in the curb) may be used to heat the curb (or other areas).

Figure 4:
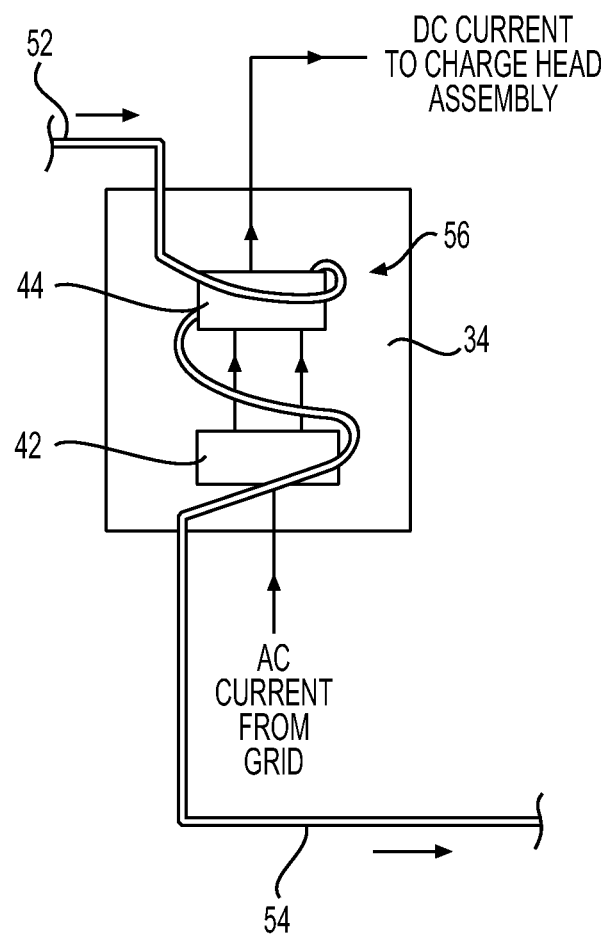
FIG. 4 is a schematic illustration of another exemplary charging station.

In some embodiments, a liquid coolant may be used to remove heat from the charge console 34. FIG. 4 illustrates an exemplary embodiment of a charge console 34 with a liquid cooling loop 56 having a liquid coolant flowing therethrough. A cooler coolant (e.g., cool water 52) may absorb heat from the heat producing components of the change console 34 and exit as a warmer coolant (warm water 54). The warm water 54 may then be used to heat any desired area of the bus stop 50. In some embodiments, the liquid cooling loop 56 may be fluidly coupled to a building heating system to assist in heating of the building. The liquid cooling loop 56 may be an open loop system or a closed loop system.

In some embodiments, the heated liquid coolant (in loop 56) from console 34 may be further heated using waste heat from other sources (e.g., building heating system, etc.) before being used to heat a desired area of bus stop 50. In some embodiments, the liquid cooling loop 56 may be a closed loop. That is, after heating the desired area of the bus stop 50, the cooled coolant may be recirculated back to the console 34 to absorb more heat. It is also contemplated that, in some embodiments, the liquid coolant loop 56 may be an open loop. For instance, after absorbing heat from the console 34 (and other sources), the heated coolant may be discharged in a desired area of the bus stop 50 (the floor of the passenger waiting area, curb by the bus, road surface proximate the charging station, etc.) to melt accumulated ice/snow. In some embodiments, the heated coolant may be discharged on the charging interface 16 of the bus to assist in melting accumulated ice/snow.

In some embodiments, a liquid coolant of the bus 10 may be used to cool the battery 14 and/or other heat producing components of bus 10. This heated coolant in the bus 10 may be circulated proximate the charging interface 16 to heat and melt any accumulated ice/snow from the charging interface 16. In some such embodiments, the heated liquid coolant from loop 56 may be used to heat the charge head assembly 32. Heating the charging interface 16 using the heated liquid coolant from the bus 10, and the charge head assembly 32 using the heated coolant from the console 34 may enable the formation of a good electrical connection between the bus and the charging station.

In some embodiments, the coolant from the console (e.g., loop 56) may pass into the bus 10 to combine with the coolant of the bus 10 and jointly cool the heat producing components in the bus 10. For example, in some embodiments, conduits or pipes that transport the liquid coolant of console 34 may interface with, and make a leak-proof seal with, a conduit transporting the coolant of the bus 10 to fluidly couple the coolants together when the bus 10 is charging. In some embodiments, the charging interface 16 and the charge head assembly 32 may include separable leak-free fluid interconnections that enable transfer of the coolant from the console 34 to the bus 10 (and vice versa) with minimal leak. When the charge head assembly 32 interfaces with the charging interface 16 during charging, the coolant from loop 56 may pass into the bus 10 to combine with and cool the heat producing components of the bus 10. Transferring the coolant through the charging interface 16 may help cool the motor, the inverter, and other heat producing components of the bus 10 and the bus stop 50 while also warming and melting ice/snow from the charging interface 16.

While principles of the present disclosure are described with reference to harnessing the heat produced while charging an electric bus, it should be understood that the disclosure is not limited thereto. Rather, the systems and methods described herein may be employed while recharging any electric vehicle (all-electric or hybrid vehicles). Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A method of operating an electric vehicle charging station, the charging station including a console housing components configured to receive current from an electric grid and convert the current to a form adapted to be received by the electric vehicle, comprising:

transferring heat from the components in the console to air flowing through the console to form heated air;

directing the heated air from the console into a duct fluidly coupled to the console; and exhausting the heated air from the duct to a location remote from the console.

2. The method of claim 1, wherein the location remote from the console is located at a distance greater than or equal to about 5 feet away from the console.

3. The method of claim 1, further including electrically connecting an electric vehicle to the charging station, wherein exhausting the heated air includes exhausting the heated air proximate a charging interface of the electric vehicle to heat the charging interface.

4. The method of claim 1, wherein exhausting the heated air includes at least one of (a) exhausting the heated air proximate an open door of the electric vehicle, and (b) exhausting the heated air at a passenger waiting area of the charging station.

5. The method of claim 1, wherein exhausting the heated air includes using the heated air to heat a curb area proximate the electric vehicle.

6. The method of claim 1, further including electrically connecting a charging interface on a roof of an electric bus with an overhanging charging head assembly of the charging station.

7. The method of claim 6, wherein exhausting the heated air includes exhausting the heated air into the charging head assembly.

8. The method of claim 1, wherein directing the heated air from the console includes transferring heat from the heated air to a liquid at a heat exchanger.

9. The method of claim 1, wherein directing the heated air includes directing the heated air through a duct located below ground.

10. A method of operating a charging station of an electric bus, the charging station including a console housing one or more components configured to convert AC current from an electric grid to DC current for the electric vehicle and a charge head assembly configured to electrically couple with the electric bus, comprising:

transferring heat from the one or more components in the console to a coolant flowing through the console; and directing the coolant to a location remote from the console to dissipate the heat at the location.

11. The method of claim 10, wherein the location remote from the console is located at a distance greater than or equal to about 5 feet away from the console.

12. The method of claim 10, further including connecting a charging interface of the electric bus to the charge head assembly, and using the dissipated heat to heat the charging interface of the bus.

13. The method of claim 10, further including using the dissipated heat to heat the charge head assembly of the charging station.

14. The method of claim 10, further including using the dissipated heat to heat a curb area proximate the bus.

15. The method of claim 10, wherein the coolant is air, and wherein directing the coolant includes directing the coolant through a duct extending between the console and the location remote from the console.

16. A charging station for an electric vehicle, comprising:

a charging head assembly configured to interface and form an electrical connection with an electric vehicle;

a console electrically coupled to the charging head assembly, the console housing components configured to receive current from an electric grid and convert the current to a form that may be received by the electric vehicle, the console further being configured to direct a flow of air therethrough to absorb heat from the components and form heated air; and a duct connected to the console to receive the heated air from the console and discharge the heated air to a location remote from the console.

17. The charging station of claim 16, wherein the duct is configured to discharge the heated air at a location greater than or equal to about 5 feet away from the console.

18. The charging station of claim 16, wherein the electric vehicle is a bus and the console includes a rectifier configured to convert AC current to DC current.

19. The charging head of claim 16, wherein the duct is configured to discharge the heated air on the charging head assembly.

20. The charging head of claim 16, wherein the duct is configured to discharge the heated air on the electric vehicle.

* * * * *